United States Patent

Walters

[15] 3,693,030

[45] Sept. 19, 1972

[54] TIME DELAY CIRCUITS

[72] Inventor: William R. Walters, Medford, N.J.

[73] Assignee: Radio Corporation of America

[22] Filed: May 17, 1967

[21] Appl. No.: 639,186

[52] U.S. Cl. ....................... 307/273, 330/69, 330/97, 307/310

[51] Int. Cl. ............................................... H03k 3/10

[58] Field of Search .............307/297, 273, 310, 246; 330/97, 69

[56] References Cited

UNITED STATES PATENTS

| | | | |
|---|---|---|---|
| 2,767,311 | 10/1956 | Meyer | 328/67 |
| 2,770,732 | 11/1956 | Chong | 307/273 |
| 2,819,397 | 1/1958 | Davis | 307/289 |
| 3,171,978 | 3/1965 | Weber | 307/273 |
| 3,274,399 | 9/1966 | Sheng | 307/273 |
| 3,364,441 | 1/1968 | Rogers | 307/293 |

*Primary Examiner*—James W. Lawrence
*Assistant Examiner*—Harold A. Dixson
*Attorney*—Edward J. Norton

[57] ABSTRACT

A time delay circuit is described which uses an operational amplifier as a main active element. A switching transistor and a timing circuit are coupled to the amplifier such that the transistor is normally in a non-conductive or high impedance state. The transistor is operated by the combination of the timing circuit and amplifier so that the transistor, when made by a trigger input to assume its conductive or low impedance state, remains in that state causing the operational amplifier to produce an output signal of accurate duration primarily determined by the timing circuit and independent of the trigger input.

7 Claims, 2 Drawing Figures

INVENTOR
WILLIAM R. WALTERS
BY Edward J. Norton
ATTORNEY

INVENTOR.
William R. Walters
BY
Edward J. Norton
ATTORNEY

TIME DELAY CIRCUITS

BACKGROUND OF INVENTION

For numerous applications now existing in the digital information field, as well as in applications concerned with accurate digital control of servos, there is a need for devices which can accurately determine or set a specified timed interval. In general, prior art devices used for this purpose include a reactive network and some sort of comparison means. The timing is begun by applying a potential to the reactive network which, because of the time constant involved, develops a signal whose magnitude changes with time. When this signal reaches a predetermined value, the comparator indicates the termination of the time interval.

Transistorized monostable multivibrators are examples of prior art devices which perform these functions and which are widely used in the field. In such multivibrators, a pair of transistor switches are cross-coupled in a manner such that one is actuated at the end of a predetermined time delay following the actuation of the other. However, the duration of such time delays is dependent upon may factors which include the magnitude of the supply voltages and, more important, the parameters of the switching transistors utilized. As the time delays required become longer, the accuracy of the time interval determined by such prior art devices decreases. Since the factors which affect the duration of the time delay are subject to variation, particularly, where the multivibrator is to be operated for an extended period of time or in an environment of changing temperature, the provision of a time interval having the precision required by some of the existing applications becomes a difficult if not impossible task. Further because the resistors incorporated in such devices are part of the biasing means for the individual transistors, relatively large capacitance values are necessary in the reactive portions of the device to achieve very long time delays.

It is, therefore, an object of the present invention to provide an improved time delay circuit having greater accuracy than previously obtainable.

A further object is to provide an accurate, transistorized, time delay circuit whose timing interval is virtually independent of varying transistor characteristics.

SUMMARY OF THE INVENTION

The present invention includes an operational amplifier having input and output terminals and operating in an inverting mode. The operational amplifier produces a potential at its output which is opposite to a potential applied at its input, and, hence, the term "inverting" is used as an adjective. The operational amplifier which may be in the form of an integrated circuit is provided with suitable biasing potentials. The output of the amplifier is coupled to the input electrode of a switching transistor in a manner to place the transistor normally in its nonconducting or high impedance state. A timing capacitor couples the output electrode of the switching transistor to the input terminal of the operational amplifier. One terminal of a timing resistor is connected to the junction of the timing capacitor and the input terminal of the operational amplifier. The other terminal of the resistor is returned to a point of operating potential. A trigger input circuit is coupled to the input electrode of the transistor.

The operation of the trigger input circuit causes the transistor to switch from its high impedance or nonconductive state to a low impedance or conductive state. This change in state causes a change in the potential at the output electrode of the transistor which is coupled to the high gain, operational amplifier and in turn causes this amplifier to change its output potential in a manner to maintain the switching transistor in the conductive state independent of the operation of the trigger input circuit and for a time duration primarily determined by the above described timing circuit. Using the operational amplifier in the manner described produces a circuit whose time delay is primarily determined by the characteristics of the timing circuit because of the optimum impedances presented to the critical components by the operational amplifier.

DESCRIPTION

Figure 1:
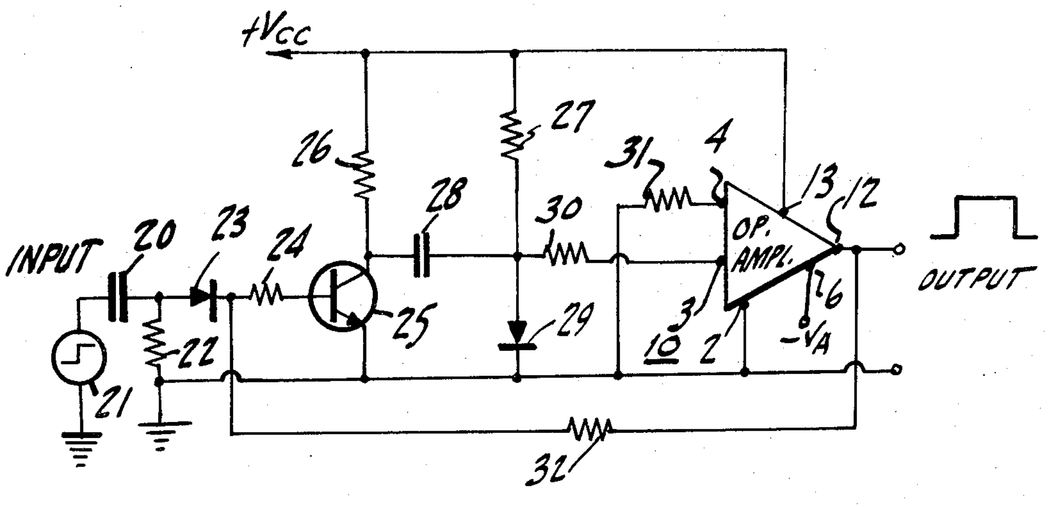
FIG. 1 of the drawing schematically illustrates one embodiment of the present invention.

If reference is made to FIG. 1 of the drawing, there is shown an operational amplifier 10 which may be fabricated as a monolithic integrated circuit. Operational amplifiers are known in the art, such devices being used to perform various types of analog functions. Numerous examples of such amplifiers are now available. For example, reference is made to RCA Integrated Circuit Application Note No. ICAN-5015, published November 1965, entitled "Application of the RCA CA3008 and CA3010 Integrated Circuit Operational Amplifiers." Generally, an operational amplifier is one which has a high input impedance and low output impedance and can be considered in simple terms an ideal voltage amplifier. The operational amplifier in this particular application is shown as one which performs an inverting function. The amplifier 10 includes an inverting input terminal 3. If a voltage of a given polarity is impressed upon terminal 3, the output terminal 12 of the operational amplifier will provide a voltage of opposite polarity or of opposite sense. A terminal 13 of the operational amplifier is adapted to receive a biasing potential and as such is shown connected to a source of potential designated as +Vcc. There is also shown a terminal 6 at which a negative biasing potential −Va is supplied. Numeral 2 represents a common terminal at which a point of reference potential such as ground is connected.

Figure 2:
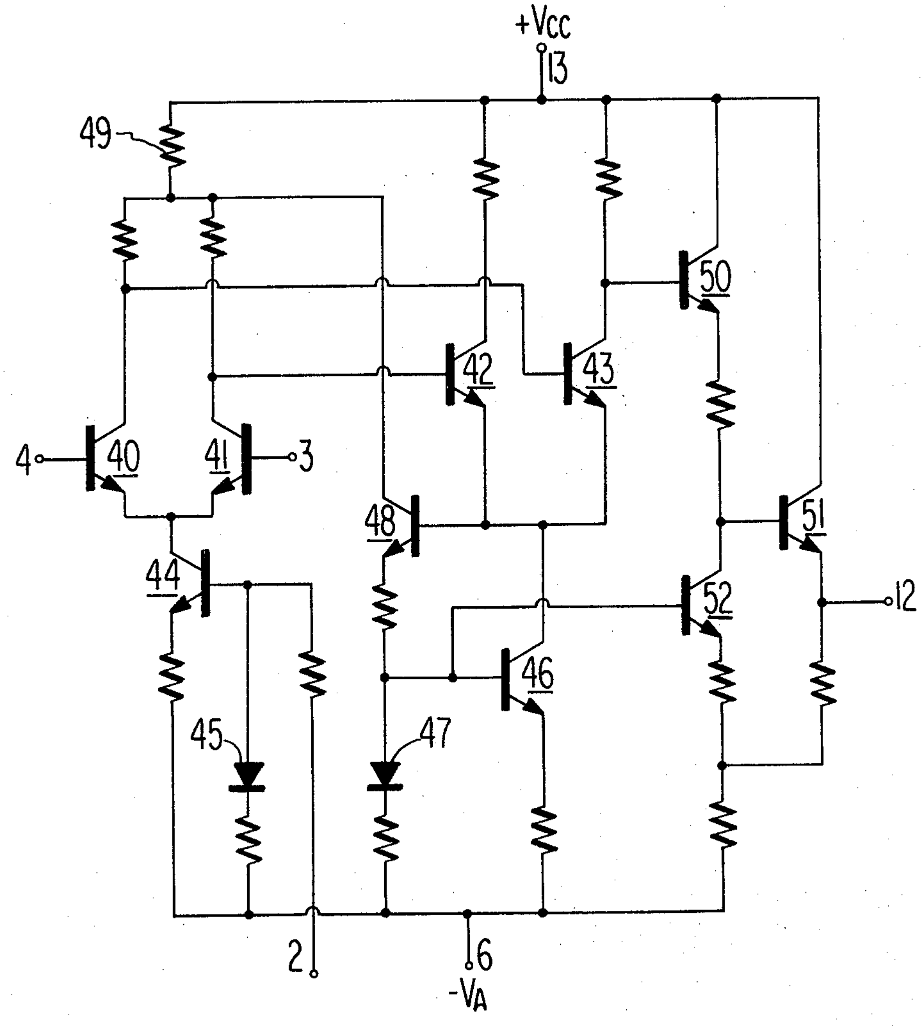
FIG. 2 is a schematic diagram of a circuit embodiment for the operational amplifier portion of FIG. 1.

As shown in FIG. 2, the operational amplifier 10 may consist of two differential amplifiers and a single-ended output circuit in cascade. Circuit elements are also included to provide thermal stabilization and to compensate for shifts in the dc operating point. In addition, negative feedback loops are employed to cancel common-mode signals.

The pair of cascaded differential amplifiers are responsible for virtually all the gain provided by the operational-amplifier circuit. The inputs to the operational amplifier are applied to the bases of the pair of emitter-coupled transistors, 40 and 41, in the first differential amplifier. The inverting input at terminal 3 is applied to the base of transistor 41, and the non-inverting input at terminal 4 is applied to the base of transistor 40. The transistors 40 and 41 develop the driving signals for the second differential amplifier comprising transistors 42 and 43. A dc constant-current-sink transistor, 44, is also included in the first stage to provide bias stabilization for transistors 40 and 41. Diode 45 provides thermal compensation for the first differential stage.

The emitter-coupled transistors, 42 and 43, in the second differential amplifier are driven push-pull by the outputs from the first differential amplifier. Bias stabilization for the second differential amplifier is provided by current-sink transistor 46. Compensating diode 47 provides the thermal stabilization for the second differential amplifier and also for the current-sink transistor, 47, in the output stage.

Transistor 48 develops the negative feedback to reduce common-mode error signals that are developed when the same input is applied to both input terminals of the operational amplifier. Transistor 48 samples the signal that is developed at the emitters of transistors 42 and 43. Because the second differential stage is driven push-pull, the signal at this point will be zero when the first differential stage and the base-emitter circuits of the second stage are matched and there is no common-mode input. A portion of any common-mode, or error, signal that appears at the emitters of transistors 42 and 43 is developed by transistor 48 across resistor 49 (the common collector resistor for transistors 40, 41 and 48) in the proper phase to reduce the error. The emitter circuit of transistor 48 also reflects a portion of the same error signal into current-sink transistor 46 in the second differential stage so that the activating error signal is further reduced.

Transistor 48 also develops feedback signals to compensate for dc common-mode effects produced by variations in the supply voltages. For example, a decrease in the dc voltage from the positive supply +Vcc results in a decrease in the voltage at the emitters of transistors 42 and 43. This negative-going change in voltage +Vcc is reflected by the emitter circuit of transistor 48 to the bases of current-sink transistors 46 and 52. Less current then flows through these transistors. The decrease in the collector current of transistor 46 results in a reduction of the current through transistors 42 and 43, and the collector voltages of these transistors tend to increase. This tendency to increase on the part of the collector voltages partially cancels the decrease that occurs with the reduction in the positive supply voltage. The partially cancelled decrease in the collector voltage of transistor 43 is coupled directly to the base of transistor 50 and is transmitted by the emitter circuit of transistor 50 to the base of output transistor 51. At this point, the decrease in voltage is further cancelled by the increase in the collector voltage of current-sink transistor 52 that results from the decrease in current mentioned above.

In a similar manner, transistor 48 develops the compensating feedback to cancel the effects of an increase in the positive supply voltage or of variations in the negative supply voltage. Because of the feedback stabilization provided by transistor 48, the operational amplifier provides high common-mode rejection, has excellent open-loop stability, and has a low sensitivity to power-supply variations.

In addition to their function in the cancellation of supply-voltage variations, transistors 50, 52 and 51 are used in an emitter-follower type of single-ended output circuit. The output of the second differential amplifier is directly coupled to the base of transistor 50, and the emitter circuit of transistor 50 supplies the base-drive input for output transistor 51. A small amount of signal gain in the output circuit is made possible by the bootstrap connection from the emitter of output transistor 51 to the emitter circuit of transistor 52. If this bootstrap connection were neglected, transistor 52 could be considered as merely a dc constant-current sink for drive transistor 50. Because of the bootstrap arrangement, however, the output circuit can provide for example a signal gain of 1.5 from the collector of differential-amplifier transistor 43 to the output terminal 12.

The output from the operational-amplifier circuit is taken from the emitter of output transistor 51 so that the dc level of the output signal is substantially lower than that of the differential-amplifier output at the collector of transistor 43. In this way, the output circuit shifts the dc level at the output so that it is effectively the same as that at the input when no signal is applied.

In FIG. 1 a switching transistor 25 of NPN conductivity is provided. The collector electrode of transistor 25 is returned to +Vcc through a load resistor 26. The emitter of transistor 25 is connected to a point of reference potential. Also shown connected to the collector of transistor 25 is a timing capacitor 28. The other terminal of capacitor 28 is connected to one terminal of a timing resistor 27 whose other terminal is coupled to +Vcc. The junction of capacitor 28 and timing resistor 27 is connected to the anode of a biasing diode 29 and to a current limiting resistor 30. The opposite terminal of resistor 30 is connected to the inverting input terminal 3 of the operational amplifier 10. The cathode of the biasing diode 29 is returned to a point of reference potential. Coupled to the output terminal 12 of the operational amplifier 10 is a feedback resistor 32 whose other terminal is connected to the base of transistor 25 through a limiting resistor 24. The junction of the feedback resistor 32 and the limiting resistor 24 is connected to the cathode of a triggering diode 23. The anode of the triggering diode 23 is returned to a point of reference potential such as ground through a resistor 22. The junction of the resistor 22 and the anode of diode 23 is connected to one terminal of a capacitor 20 whose other terminal is connected to a suitable source of trigger pulses 21. There is also shown a resistor 31 connected between the non-inverting input 4 of the operational amplifier 10 and a point of reference potential such as ground The output of the monostable timing circuit described is taken between the output terminal 12 of the operational amplifier 10 and the point of reference potential or ground.

The time delay circuit operates in the following manner. In the off-state of the circuit, the transistor 25 is in its high impedance or non-conductive state and the operational amplifier 10 is in a state designated as its on or high state. A bias is provided for the operational amplifier to maintain it in this on state via resistor 27 and diode 29. The voltage at the junction of these two components causes the output of the operational amplifier 10 to assume a negative voltage with respect to +Vcc. This negative voltage is fed back through resistor 32 to the base of transistor 25 thereby keeping the transistor 25 in its high impedance or non-conductive state. In this condition, there is no current flow through transistor 25 and virtually little voltage drop across resistor 26. Therefore, the voltage at the collector of transistor 25 is substantially equal to the supply voltage +Vcc and the charge on capacitor 28, in this state, is +Vcc minus the voltage at the junction of the resistor 27 and the diode 29. When a positive trigger is supplied by the source 21, the trigger input is coupled through capacitor 20, diode 23, and resistor 24 to the base of the transistor 25. The action of the positive trigger pulse causes transistor 25 to switch from its high impedance or non-conductive state to a low impedance or conductive state. This in turn causes the collector voltage of transistor 25 to go from +Vcc to nearly the point of reference potential or ground. Because the charge across capacitor 28 cannot change instantaneously, this negative transition is coupled to the input terminal 3 of the operational amplifier 10 via resistor 30. This negative transition causes the operational amplifier 10 to turn to its full off state and its output goes to a value approaching +Vcc. The action of the output terminal 12 of the operational amplifier 10 causes transistor 25 to be held in its low impedance state due to the feedback resistor 32. The diode 23 further serves to block the feedback voltage transition from coupling to the trigger source 21. During this time diode 29 is reversed biased because of the charge on capacitor 28. The capacitor 28 begins to discharge through resistor 27 to the supply voltage +Vcc. To do this the capacitor 28 must discharge to the ground reference and continue charging to the supply voltage +Vcc. As the voltage on capacitor 28 reverses and the voltage at the junction of capacitor 28 and resistor 27 becomes positive with respect to the ground reference, the output 12 of the operational amplifier 10 goes negative with respect to ground reference. This transition is in turn fed back through resistor 32 in the manner described previously, causing transistor 25 to turn off and hence causing the voltage at the collector of transistor 25 to go in a positive direction or towards +Vcc. Because of the charge on capacitor 28, the junction of capacitor 28 and resistor 27 goes positive. This forward biases diode 29 and serves to clamp the input terminal 3 of the operational amplifier 10 through resistor 30 to a value causing the operational amplifier to assume its on state, and hence the circuit again becomes stable.

As the operational amplifier 10 presents a high input impedance, the timing circuit is virtually unloaded by the amplifier 10 during its transition period and hence the time delay produced by the circuit is purely a function of the values of resistor 27 and capacitor 28 and not a function of the operational amplifier. Transistor 25's characteristics also are of a minimum effect in determining the precision delay of the circuit, as transistor 25 operates as a switch, namely, in either its conducting or non-conducting state, and as such can exhibit wide spread changes in characteristics without effecting the operation of the circuit as described. The RC circuit at the input of the transistor 25 consisting of capacitor 20 and resistor 22 further serves to insure constant input impedance with the help of diode 23 and resistors 24 and 32. The diode 23 isolates the driving circuit including source 21 from the feedback produced by the action of the operational amplifier 10. Due to this circuit arrangement the input load exhibits very little impedance change for a suitable positive trigger.

A circuit designed in accordance with the schematic shown in the drawing produced variable delays with good stability. The circuit exhibited a timing stability better than plus or minus 0.2 percent using a 1 percent resistor for R27. Duty cycles up to 90 percent were also achievable when the circuit shown was used as a delay circuit. To achieve a time delay of 18 milliseconds, the following components were used.

| | |
|---|---|
| Operational Amplifier 10 | RCA 3008 |
| Capacitor 20 | 0.1 microfarads |
| Capacitor 28 | 0.22 microfarads |
| Resistor 22 | 1 kilohms |
| Resistor 24 | 10 kilohms |
| Resistor 26 | 680 ohms |
| Resistor 27 | 121 kilohms |
| Resistor 30 | 10 kilohms |
| Resistor 31 | 10 kilohms |
| Resistor 32 | 10 kilohms |
| Diode 23 and 29 | 1N456 |
| Transistor 25 | MPS6521 or 2N697 |

These values are representative. Delays of 10 to 1 were obtained by replacing resistor 27 with a 500 kilohm potentiometer. Long delays approaching seconds were also achieved by using a 10 microfarad tantalum capacitor for capacitor 28.

What is claimed is:

1. A time delay circuit having input and output terminals, comprising:
   - a transistor having base, emitter and collector electrodes with said base electrode coupled to said input terminal;
   - means coupled to said input terminal for applying a trigger input to the base electrode of said transistor to render said transistor conducting;
   - a timing network having its input coupled to said collector electrode;
   - circuit means connected between said output terminal and the output of said timing network and operable to assume one state in which a high potential appears at said output terminal and a second state in which a low potential appears at said output terminal in response to the output of said timing network, said circuit means including high gain transistorized amp lifting means for providing high impedance to said timing network and a sharp transition between said first and second states, feedback transistor means coupled about said amplifying means compensating for operating imbalance of said amplifying means, diode means coupled to said amplifying means for providing the thermal stabilization of said amplifying means, and further transistor means coupled to said amplifying means for rendering said circuit means substantially insensitive to changes in operating potentials applied to said circuit means;
   - means for applying operating potentials to said transistor electrodes and to said circuit means; and means for coupling said output terminal to said transistor base electrode for maintaining said transistor conducting for a period determined substantially by said timing network.

2. The invention according to claim 1 wherein;

said amplifying means comprises a plurality of transistor stages direct coupled as differential amplifier means including a signal inverting path between said output of said timing network and said output terminal.

3. The invention according to claim 1 wherein:

said amplifying means comprises at least one differential amplifier stage having an inverting and a non-inverting signal path, said inverting signal path being coupled to the output of said timing network with said non-inverting signal path being coupled to a point of reference potential such that the input of said non-inverting path is maintained substantially at ground potential.

4. The invention according to claim 1 wherein, said amplifying means comprises first and second differential amplifying means with said second differential amplifying means being driven in push pull relationship from said first differential amplifying means, and emitter follower means coupled to said second differential amplifying means for providing a low impedance output from said circuit means.

5. The invention according to claim 1 and further including; isolating means coupled between said base electrode and said input terminal, and clamping means connected to said timing network for limiting the signal output of said timing network to a value to cause said circuit means to return to the state which renders said transistor non-conducting after a predetermined period.

6. The invention according to claim 1 and wherein said timing network comprises; a capacitor having one terminal coupled to said collector electrode and its other terminal coupled to the input of said circuit means, a resistor coupled between a source of unidirectional potential and the junction of said capacitor and said circuit means input, a diode having an anode and cathode, and means coupling said junction to said anode and said cathode to a point of reference potential.

7. The invention according to claim 1 and wherein said trigger input means comprises; a source of trigger pulses, a capacitor, a unidirectional current conducting device, means series connecting said source through said capacitor and said device to said base electrode, and a resistor connected between a point of reference potential and the junction of said capacitor and said device.

* * * * *